(12) United States Patent
Jones et al.

(10) Patent No.: US 7,592,728 B2
(45) Date of Patent: Sep. 22, 2009

(54) ELECTRIC MACHINE HAVING SEGMENTED STATOR

(75) Inventors: Robert M. Jones, 3117 Endsley Rd., Brooksville, FL (US) 34609; Joseph M. Lisiecki, Springhill, FL (US)

(73) Assignee: Robert M. Jones, Brooksville, FL (US)

( * ) Notice: Subject to any disclaimer, the term of this patent is extended or adjusted under 35 U.S.C. 154(b) by 0 days.

(21) Appl. No.: 11/800,716

(22) Filed: May 7, 2007

(65) Prior Publication Data

US 2007/0296298 A1 Dec. 27, 2007

Related U.S. Application Data

(60) Provisional application No. 60/799,111, filed on May 10, 2006.

(51) Int. Cl.
*H02K 1/12* (2006.01)

(52) U.S. Cl. .................................. 310/112; 310/49 R

(58) Field of Classification Search ............... 310/112, 310/113, 114, 156.25, 77, 93, 49 R
See application file for complete search history.

(56) References Cited

U.S. PATENT DOCUMENTS

| | | | |
|---|---|---|---|
| 3,809,990 A | | 5/1974 | Kuo et al. |
| 3,921,017 A | * | 11/1975 | Hallerback .................. 310/216 |
| 4,035,677 A | | 7/1977 | Kusayama et al. |
| 4,355,249 A | * | 10/1982 | Kenwell .................. 310/49 R |
| 4,394,594 A | | 7/1983 | Schmider et al. |
| 4,556,809 A | * | 12/1985 | Beisse et al. ................ 310/114 |
| 4,777,397 A | | 10/1988 | Parshall |
| 5,008,572 A | | 4/1991 | Marshall et al. |
| 5,140,210 A | | 8/1992 | Shirakawa |
| 5,347,191 A | | 9/1994 | Wood |
| 5,554,900 A | | 9/1996 | Pop, Sr. |
| 5,789,831 A | | 8/1998 | Kregling |
| 5,861,693 A | | 1/1999 | Takahashi |

(Continued)

FOREIGN PATENT DOCUMENTS

JP 6 193583 7/1994

(Continued)

OTHER PUBLICATIONS

Brushless DC Motor, <URL: www.freescale/com>, downloaded Feb. 5, 2007.

(Continued)

*Primary Examiner*—Michael C Zarroli
(74) *Attorney, Agent, or Firm*—Hamilton, Brook, Smith & Reynolds, PC

(57) ABSTRACT

An electric machine, such as a brushless direct current motor, includes a number of stator formed as stator sections. The stator sections are longitudinally offset from each other along a common central axis of the electric machine. The stator sections are magnetically independent of one another, but are electrically driven with offset phases typically in a manner similar to a standard multi-phase motor. The stator sections may be further offset with one another in radial position. The structure of the stator sections provides advantages in terms of efficiency, power consumption, torque, and thermal performance, and can be especially advantageous where a battery is used to power the motor, such as in portable hand tools or driving motors for vehicles.

20 Claims, 2 Drawing Sheets

U.S. PATENT DOCUMENTS

| | | | |
|---|---|---|---|
| 5,929,547 | A | 7/1999 | Kim |
| 5,982,074 | A | 11/1999 | Smith et al. |
| 6,153,953 | A * | 11/2000 | Isozaki et al. ............. 310/49 R |
| 6,538,356 | B1 | 3/2003 | Jones |
| 6,621,189 | B1 | 9/2003 | Flynn |
| 6,700,270 | B2 | 3/2004 | Yanashima et al. |
| 6,800,970 | B2 * | 10/2004 | Aoshima .................. 310/49 R |
| 6,888,279 | B2 | 5/2005 | Haner |
| 6,909,215 | B2 | 6/2005 | Bryant |
| 6,924,579 | B2 | 8/2005 | Calley |
| 6,992,418 | B2 | 1/2006 | Hans |
| 7,002,275 | B2 * | 2/2006 | Hans ..................... 310/156.47 |
| 7,051,421 | B2 | 5/2006 | Biais et al. |
| 7,057,326 | B2 | 6/2006 | Ren et al. |
| 7,129,608 | B2 | 10/2006 | Eppler et al. |
| 7,144,468 | B2 | 12/2006 | Decristofaro et al. |
| 2002/0109428 | A1 * | 8/2002 | Kudlacik ..................... 310/91 |

OTHER PUBLICATIONS

Kikuchi, T. and Kenjo, T., "A Unique Desk-top Electrical Machinery Laboratory for the Mechatronics Age," *IEEE*, pp. 1-20, (1997),<URL: www.ewh.ieee.org> downloaded Feb. 5, 2007.

Luk, P.C.K., and Jinupon, K. P., "Direct Work Control for a Three-Stack Switched Reluctance Motor," *IEEE*, 0-7803-9033:24622466 (2005).

\* cited by examiner

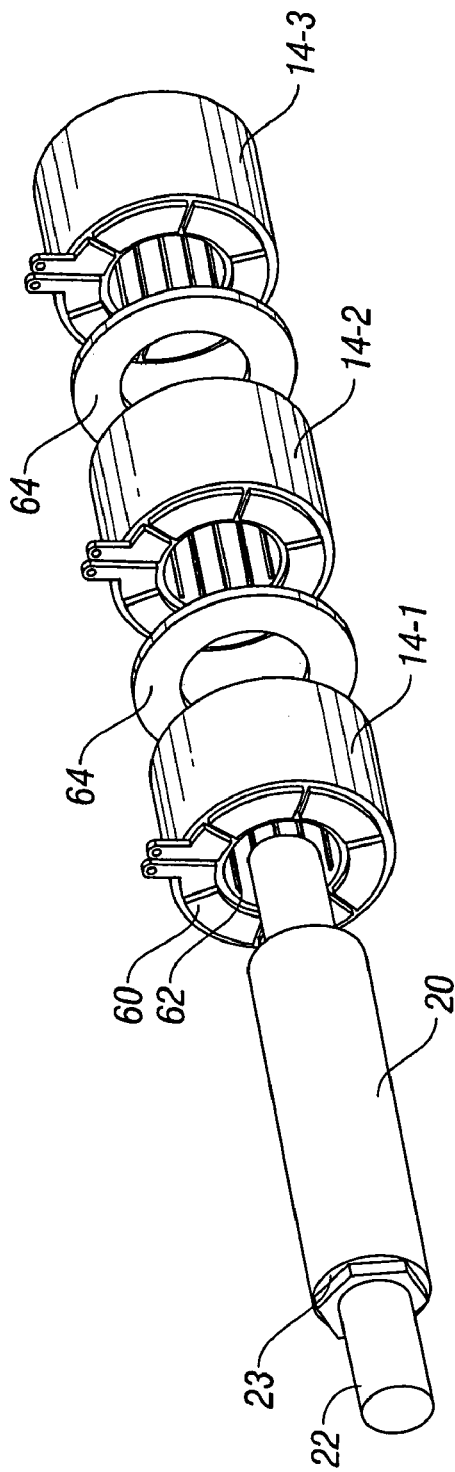
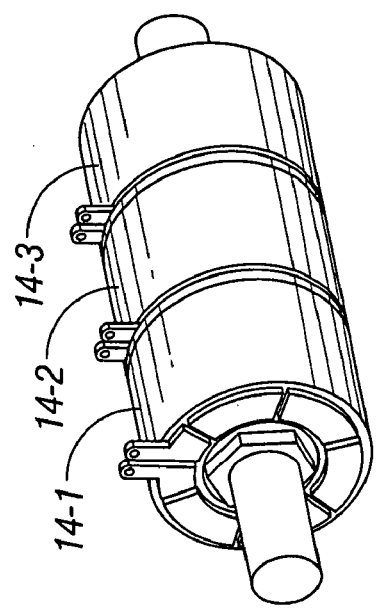
FIG. 2A
FIG. 2B

ELECTRIC MACHINE HAVING SEGMENTED STATOR

CROSS REFERENCE TO RELATED APPLICATIONS

This application claims the benefit of U.S. Provisional Application No. 60/799,111 filed on May 10, 2006. This application also is related to U.S. patent application Ser. No. 11/800,715, entitled "CRIMPED ROTOR FOR AN ELECTRIC BRUSHLESS DIRECT CURRENT MOTOR", which is being filed concurrently herewith. The entire teachings of the above applications are incorporated herein by reference.

BACKGROUND OF THE INVENTION

The present disclosure relates to an electric machine, such as a motor or generator, and in particular to a machine that has a segmented stator.

One common type of electric machine is a brushless direct current (DC) motor that consists of two major elements, a stator and a rotor. The stator typically includes a wire coil having a number of windings. The rotor typically includes permanent magnets. The rotor and stator are mechanically arranged such that the rotor can move freely with respect to the fixed stator. As a result, electromagnetic interaction between the stator and the rotor causes the rotor to move in response to polarity changes in the stator windings.

One common design has the rotor embedded as a shaft that turns inside a cylindrical stator. The stator is often made by laminating a number of disks formed of a ferrous material to form a "back iron." The disks typically have formed therein tines, to provide a structure around which are wrapped copper wire strands to form the motor windings.

The rotor assembly typically includes a number of permanent magnets placed about a shaft. The magnets are held on the shaft by an outer sleeve. The rotor assembly is then rotatively supported within the cylindrical stator housing via low friction bearings.

In one particular DC brushless motor that was described in U.S. Pat. No. 6,538,356 which is herein incorporated by reference in its entirety, the windings are instead provided by a set of electrically conductive blade structures. Interconnections between the blade structures are provided in this motor by a set of disks connected to the ends of the blades. The disks are formed from an insulating substrate material having electrically conductive portions formed thereon, to provide the desired interconnections between the blades.

Another patent is U.S. Pat. No. 3,809,990 by Kuo et al. which is herein incorporated by reference in its entirety, and which discloses a motor having a stator. Kuo et al. discloses a four phase stator winding that is wound around a number of long stator poles in a stator. These long stator poles are disadvantageous. The windings must be wound around the stator poles, and this provides that the winding is located more distant from the rotor. This excessive distance thereby reduces the amount of electromagnetic flux and electromagnetic interaction between the winding and the rotor.

SUMMARY OF THE INVENTION

An embodiment according to the present disclosure is a motor. The motor has a cylindrical stator comprising a plurality of stator sections. The stator sections each have their own associated windings that are independent of the windings of the other stators. The plurality of stator sections are longitudinally offset from each other along a common central axis of the electric machine.

Because of the resulting improved packing geometry for the windings, an embodiment according to the present disclosure provides improved torque and thermal performance in comparison with conventional single stator, multiple phase motors, as discussed further below. The stator sections can be maintained with an electrical phase difference with respect to one another. They may also be mechanically radially offset from each other. The stator sections can be wire wound or be composed of blade type sections.

Also of note is that the motor has typically a corresponding number of rotor sections, each having magnetically separate ferrous material sections. This allows a motor controller to maintain separate independent phasing for the stator and rotor sections, while at the same time driving a single shaft. The rotor sections may have permanent magents that are radially offset from section to section, and that may differ in magnetic polarity sequence from section to section.

It has been determined that motor performance can be optimized for various end uses in such a motor. If, for example, the motor is to be run from a battery, such as used in a battery powered hand tool or automobile application, efficiency is improved by use of the sectioned stators. Even for other uses, the separate stator sections provide improved power factor performance, such as when the power source is a continuous AC line voltage supply.

According to another aspect, there is provided a stator with a first stator portion, a second stator portion, and a third stator portion. Each portion includes an associated winding that is magnetically independent relative to the remainder of the stator portions. The windings are wound around a plurality of tines being located in an inner surface of each of the first through third stator portions.

In another aspect, there is provided a stator with a plurality of stator portions and a winding that is associated with each of the stator portions. The winding is magnetically independent relative to the winding of the remaining stator portions. Again, the windings are wound around a plurality of tines that are located in an inner surface of the stator portion. In yet another embodiment, each of the first through third stator portions are either longitudinally offset from one another, or radially offset from one another. In one aspect, the stator portion can be offset by about ten degrees, and as much as one hundred twenty degrees. Each stator portion is generally associated with a operating phase of an electric motor. The stator can include at least three tines for receiving the windings. The tines are internally located relative to the first through third stator sections, or can alternatively be externally located.

The stator portions can be generally cylindrically shaped, and can be made from a back iron. In another embodiment, the first through third stator portions are manufactured from a plurality of laminated disks. In yet another embodiment, the stator may only include two stator portions, instead of three stator portions with each stator portion being independent of another for improved operation. Each stator portion may serve as a single phase of the electric motor, and can be positioned to be offset from one another. A blade may be provided to provide connectivity to create the associated winding. In yet another embodiment, the stator may further include an insulating disk with the disk being located between the stator portions. At least one portion of the stator is used for one function of the electric motor or in connection with a rotor. The rotor is positioned through the stator portion. While another stator portion can be used for a different function of the electric motor. At least one function can be selected from the group consisting of power, energy generation, and braking.

BRIEF DESCRIPTION OF THE DRAWINGS

The foregoing will be apparent from the following more particular description of example embodiments of the invention, as illustrated in the accompanying drawings in which like reference characters refer to the same parts throughout the different views. The drawings are not necessarily to scale, emphasis instead being placed upon illustrating embodiments of the present invention.

FIG. 2A is an exploded view of an alternative embodiment; and

FIG. 2B is an assembled view of an alternative embodiment.

DETAILED DESCRIPTION OF THE INVENTION

Figure 1:
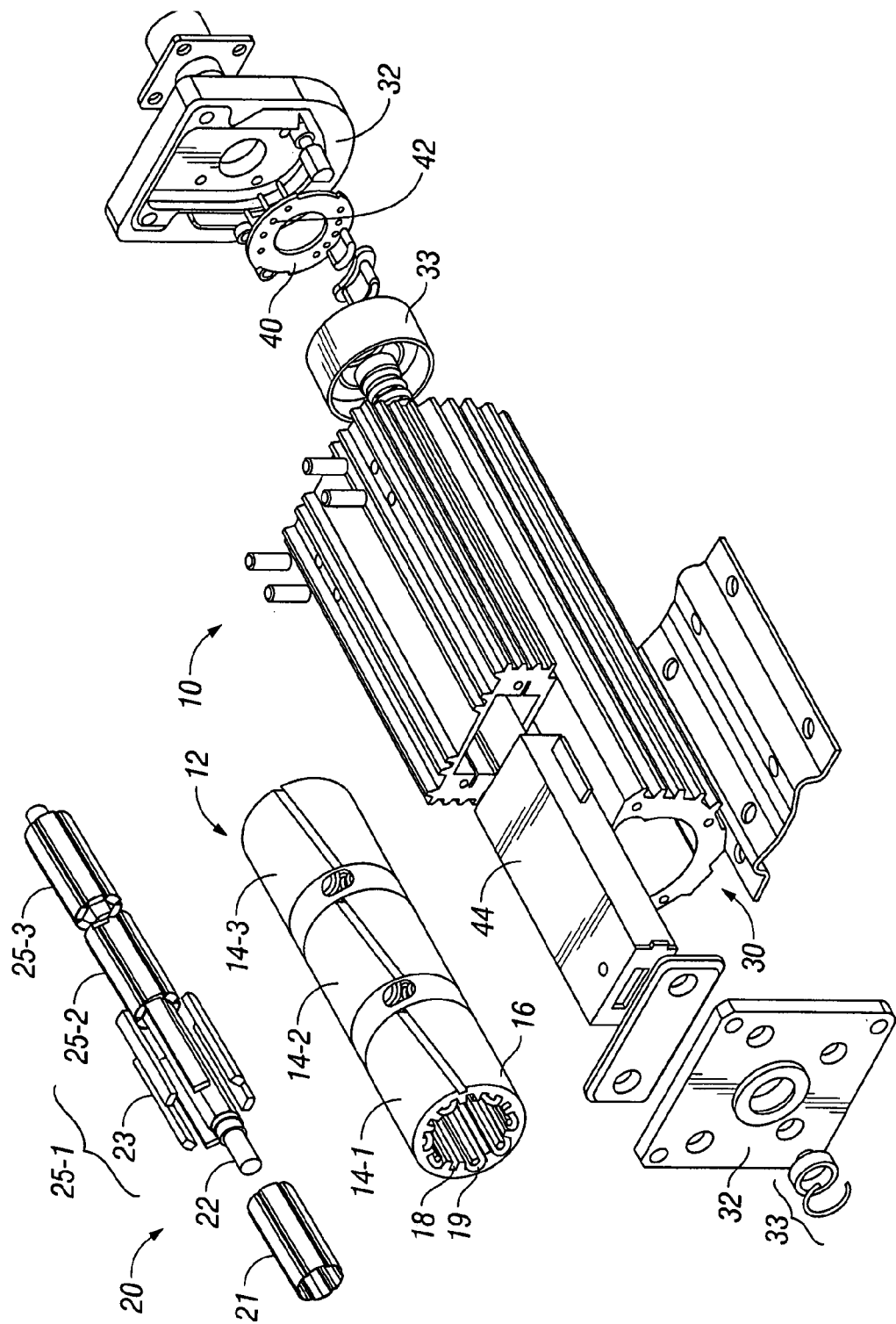
FIG. 1 is an exploded view of a motor.

A description of preferred embodiments of the invention follows.

FIG. 1 is an exploded view of a motor 10 constructed according to the present disclosure. The motor 10 has a stator 12 and rotor 20. The stator 12 in turn includes several independent stator sections 14. In the illustrated example, there are three (3) such stator sections numbered 14-1, 14-2, and 14-3, one stator section for each operating phase. It will be understood, however, that fewer or more sections might be provided and the number of sections need not correspond to the number of operating phases.

The motor 10 is of the inside DC brushless type, in which the rotor 20 is disposed along a central axis to turn inside of the stator 12. In another embodiment, the motor 10 can be of the outside DC brushless type, in which the rotor 20 is disposed along a central axis to turn outside of the stator 12, and various other configurations are possible and within the scope of the present disclosure. The rotor 20 and stator 12 assemblies are held in relative position with respect to one another by motor housing 30 and by end plates (frames) 32. The housing 30 and frames 32 may be formed of aluminum, steel, or other suitable metal. The rotor assembly 20 is held in place on frame 32 via front and rear bearings 33, on which the rotor 20 also freely rotates.

The rotor assembly 20 itself includes of outer sleeves 21, an inner rotor shaft 22, and a number of magnet bars 23. The rotor 20 actually arranges magnet sections 23 in three rotor sections 25-1, 25-2, and 25-3 in the illustrated embodiment. Thus, there is a front rotor section 25-1, a center rotor section 25-2, and rear rotor section 25-3. An exemplary rotor section 25-1 includes several magnets 23, specifically six magnet sections in the embodiment of FIG. 1, radially arranged about the shaft 22. Each magnet section 23 electromagnetically interacts with the corresponding one of the stator sections 14. The permanent magnets 23 may be enclosed in a sheath, such as outer sleeve 21, which may be made of a non-magnetic material such as stainless steel. The sheath 21 may be crimp-formed or otherwise secured around the magnets to hold them in place, which may be required when high speed operation would produce radial forces that would cause the magnets to separate from the rotor shaft.

The stator sections 14 each include a cylindrical back iron assembly 16, having a number of internal tines 18 and windings 19. As is known in the art, the back iron 16 may be built up from a number of flat disk-like pieces that are laminated to one another. The windings 19 provide the desired number of turns for the motor.

In the three-phase motor of FIG. 1, each of the stator sections serves only as a single one of the phases. Thus in a three phase motor, there are three stator and three rotor sections, with each of the stator and rotor sections providing one of the phases of the motor. Unlike the conventional three phase stator, the windings 19 are only provided for a single one of the phases in a given stator section 14, and the windings 19 are advantageously arranged in tines around an inner periphery of each of the stator sections 14 so as to be located close to the permanent magnets 23. This provides high magnetic flux between windings 19 and magnets 23.

The motor 10 may also include other components such as a position sensor 40 which contains one or more Hall-effect transducers 42 or an optical or other type of sensor, to provide information regarding the position of the magnets 23 in rotor 20. This information is fed as electrical driving signals to control electronics of a driving circuit 44, which then control current to the windings 19 as would be essential for any three-phase motor.

An additional advantage is provided in separating the stator sections 14, in that they can be mechanically offset from one another. Thus, for example, the middle stator section 14-2 may be radially offset from the front stator section 14-1 by an amount, such as about 10° or more. Similarly, the rear stator section 14-3 may be offset from the central stator section 14-2 by a corresponding amount of about 10° or more. The radial offset provides additional efficiencies in operation of the motor.

Furthermore, it can be seen that the stator sections 14 are longitudinally offset from each other along a common central axis of the motor, so that, for example, there is a front, center, and rear stator section 14-1, 14-2, and 14-3. Having separate stator sections that are longitudinally offset from each other along a common central axis of the motor provides a number of advantages for an embodiment according to the present disclosure. By comparison with a motor having multiple phase windings on a single stator, the packing geometry of the windings on a separate-stator motor according an embodiment of the present disclosure allows for a larger sized winding (or other conductive portion), which provides greater current and hence torque. Also, because of the improved packing geometry, the ratio of back iron (ferrous lamination) mass to conductor mass is increased. This improved back iron ratio provides the motor with better thermal performance than a conventional motor, allowing the motor to run longer at higher temperature.

FIGS. 2A and 2B show exploded and assembled views of a different embodiment of the present disclosure, where the stators 12 are instead provided as blades 62 and disks 60 in the manner that was described in the aforementioned U.S. Pat. No. 6,538,356, which is hereby incorporated in its entirety by reference. The structure shown in FIGS. 2A and 2B has interconnect disks 60 at the end of each stator section and blades 62 that provide connectivity to create the windings.

An insulating disk 64 is placed between the front stator 14-1 and middle stator 14-2 as well as another insulating disk 64 between center stator 14-2 and rear stator 14-3. The insulating disks 64 permit the stator sections to remain electrically isolated from one another. It should be appreciated that instead of a disk 64, other shapes are also contemplated, and the present disclosure is not limited to any such shapes to insulate stator sections 14-2, 14-3. Various insulation configurations are possible and within the scope of the present disclosure.

In this embodiment, the phase A stator 14-1 is used as a reference, and phase B stator 14-2 is rotated radially about 10° with respect to the position of stator A. Similarly, phase C stator 14-3 is rotated radially by about 20° with respect to the position of the phase A stator 14-1. Various offset configurations and radial amounts are possible and within the scope of the present disclosure.

In the example of FIG. 1, there were shown three wire turns for each stator section. In the embodiment of FIGS. 2A and 2B, there are six wire turns provided by the disks 60 and blades 62, however it should be appreciated that any number of turns may be used with the stator sections 14-1, 14-2, 14-3 of the present disclosure.

The construction of the rotor 20 in this embodiment is the same as that for the embodiment of FIG. 1. In general, the radial offset of the stator sections 14-1, 14-2, 14-3 does not necessarily correspond to the electrical phase shift between the phases for the stator sections, although for a non-limiting embodiment it may correspond. For example, a three phase motor may have a 120° phase shift between each of the three phases, but may offset the corresponding three stator sections 14-1, 14-2, 14-3 by about 10° from each other. In accordance with an embodiment of the present disclosure, the electrical phase shift and mechanical radial offset between the stator sections 14-1, 14-2, 14-3 may be adjusted to optimize motor performance characteristics, or for other reasons. Further, the permanent magnets 23 attached to the rotor shaft may be radially offset from section to section, and the magnetic polarity sequence of the permanent magnets 23 may also differ from section to section. Such radial offsets and magnetic polarity of the permanent magnets 23 may also be adjusted to optimize motor performance characteristics, in accordance with an embodiment of the present disclosure. Various configurations are possible and within the scope of the present disclosure, and such radial offsets may also be configured for manufacturing reasons.

Embodiments may be used in a variety of different possible applications, and provide advantages in efficiency, power consumption, torque, and thermal performance. In some applications, such as vehicle applications, it may be useful to have one or more of the stator sections 14-1, 14-2, and 14-3 used for power, one or more used as a generator, and/or one more used for braking. Combining such different use of the stator sections 14-1, 14-2, 14-3 may, for example, be used to enable regenerative braking (for instance by using two sections for power, and one for braking). It should be appreciated that more than three stator sections 14-1, 14-2, 14-3 are also envisioned.

In vehicle and other high-power applications, the improved thermal performance resulting from the improved packing geometry of separate stator sections 14-1, 14-2, 14-3 according to an embodiment of the present disclosure allows for a high-powered motor to run continuously. By contrast, a conventional multiple-phase electric motor, with multiple phases on a single stator, needs to be run intermittently in order to provide sufficient time for cooling the motor off. Such an advantage therefore provides significant advantages, for example, for high-powered vehicle applications, in which continuous operation is a necessity and, 14-1, 14-2, 14-3 allowing a permanent magnet brushless DC motor to be competitive with gas-powered engines.

Using separate stator sections 14-1, 14-2, 14-3 according to an embodiment of the present disclosure may also provide advantages for ease of manufacture, particularly for an internally-wound motor, since each stator section 14-1, 14-2, 14-3 needs to be wound with only one phase of windings 19 instead of having to carefully wind multiple phases on the same stator 14-1, 14-2, 14-3.

In other embodiments according to the present disclosure, it may be of advantage to vary the polarity of the magnet segments 23 on the rotor, in order to optimize power, load, or other characteristics. Turning again to FIG. 1, it is also envisioned that the stator 12 may be manufactured with two stator sections 14-1, 14-2. In this embodiment, the stator 12 is formed without the third stator section 14-3, and with the windings 19 of the stator sections 14-1, 14-2 being magnetically independent in each stator section 14-1, 14-2. Furthermore, an insulating member 60 may be placed between the two stator sections 14-1, 14-2. Various stator 12 configurations are possible, and the present stator 12 is not limited to any specific number of stator sections 14-1, 14-2, and 14-3.

While this invention has been particularly shown and described with references to preferred embodiments thereof, it will be understood by those skilled in the art that various changes in form and details may be made therein without departing from the scope of the invention encompassed by the appended claims.

What is claimed is:

1. An electric machine comprising:
a cylindrical stator comprising a plurality of stator sections, each stator section having an associated winding that is magnetically independent of the windings of the other stators, the winding being wound around an inner periphery of each of the plurality of the cylindrical stator sections, the plurality of stator sections being longitudinally offset from each other along a common central axis of the electric machine;
a rotor disposed within the cylindrical stator, the cylindrical stator and rotor configured as a DC brushless motor;
a housing configured to support the cylindrical stator and the rotor; and
a controller supported within the housing and configured to provide a separate driving signal to each stator section.

2. An electric machine according to claim 1, wherein the rotor comprises a plurality of rotor sections, each being magnetically independent of the other rotor sections.

3. An electric machine according to claim 2, wherein:
the separate driving signal provided to each stator has a different electrical phase with respect to the driving signals for the other stator sections.

4. An electric machine according to claim 2, wherein each of the plurality of rotor sections electromagnetically interacts with a corresponding one of the plurality of stator sections.

5. An electric machine as in claim 1, wherein the stator sections are wire wound.

6. An electric machine as in claim 1, wherein the stator sections comprise blade sections.

7. The electric machine of claim 6 further comprising:
one or more interconnect disks coupled to the blade sections at each stator section; and
tabs electrically coupled to at least one of the one or more interconnect disks at each stator section, the tabs associated with each stator section configured to transmit the driving signal from the controller to the associated stator section.

8. An electric machine according to claim 2, wherein the rotor comprises a plurality of permanent magnets in each of the rotor sections, the plurality of permanent magnets in at least one of the rotor sections having a different magnetic polarity sequence from the plurality of permanent magnets in another of the rotor sections.

9. A stator comprising:
a first stator portion;
a second stator portion;
a third stator portion;
wherein each of the first through third stator portions are longitudinally offset from one another along a common central axis thereof;

wherein each of the first through third stator portions further include associated blade sections and one or more interconnect disks being electrically and magnetically independent relative to the remainder of the first through third stator portions; and one or more tabs electrically coupled to at least one of the one or more interconnect disks at each stator section, the tabs also electrically coupled between the one or more interconnect disks and the blade sections.

10. The stator of claim 9, wherein each of the first through third stator portions is generally associated with an operating phase of an electric motor.

11. The stator of claim 9, wherein at least one of the first through third stator sections is generally cylindrical.

12. The stator of claim 9, wherein at least one of the first through third stator portions comprises a back iron.

13. The stator of claim 9, wherein at least one of the first through third stator portions comprises a plurality of laminated disks.

14. The stator of claim 9, wherein the first through third stator sections are all generally cylindrically shaped.

15. The stator of claim 9, wherein at least one of the stator portions is used for one function of an electric motor, while another of the plurality of stator portion is used for a different function.

16. The stator of claim 15, wherein at least one function is selected from the group consisting of power generation, energy generation, and braking.

17. The stator of claim 9, further comprising an insulating member being disposed between at least the first stator portion and the second stator portion.

18. The stator of claim 9, further comprising a second insulating member between the second stator portion and the third stator portion.

19. The stator of claim 9 further comprising:
a housing configured to support the stator portions; and
a controller, supported within the housing, configured to provide a separate driving signal to each stator portion.

20. The stator of claim 19 wherein the separate driving signal provided to each stator portion is provided at a phase different from the phases sent to the remaining stator portions.

* * * * *